R. F. COLBORNE.
MECHANISM FOR OPERATING WHEEL BRAKES BY HAND FOR RAILWAY PURPOSES.
APPLICATION FILED OCT. 20, 1911.
1,075,012.
Patented Oct. 7, 1913.
2 SHEETS—SHEET 1.
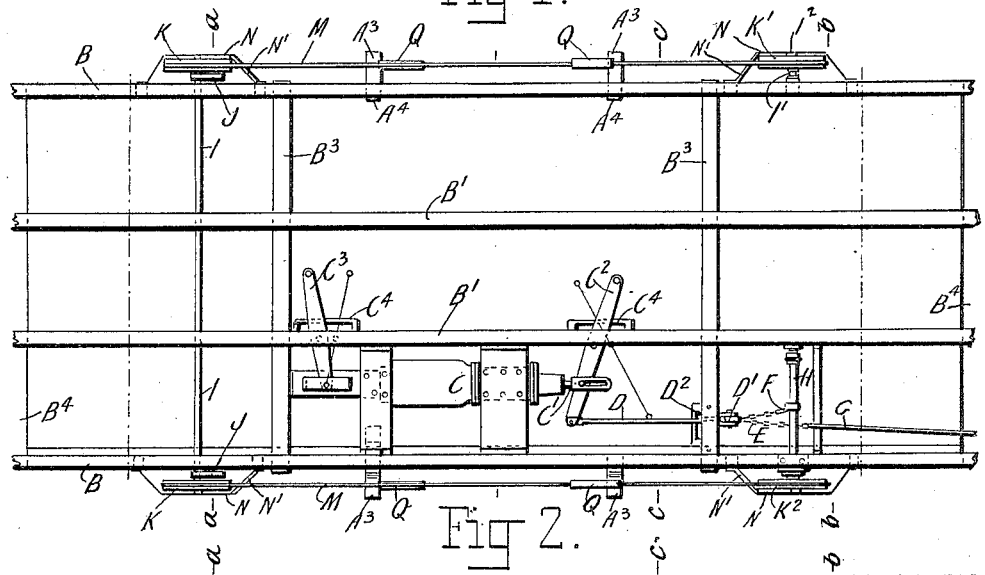
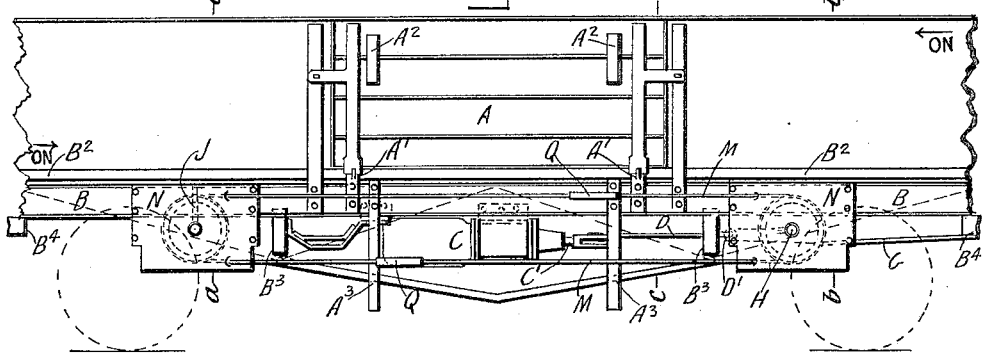
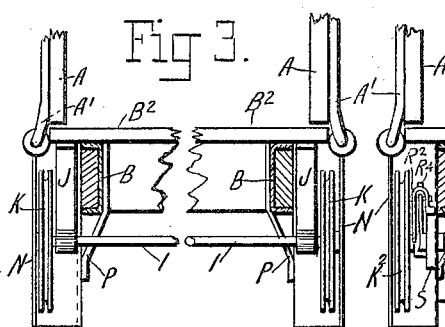
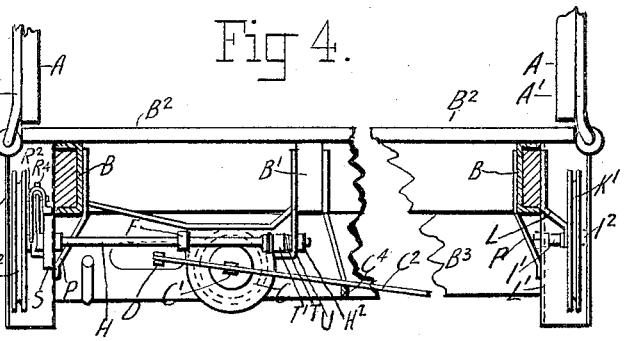
Witnesses.
John J. Stone
Harry A. Smedley
Inventor.
Robert Francis Colborne

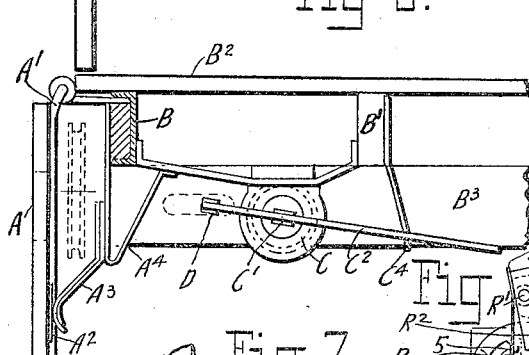

UNITED STATES PATENT OFFICE.

ROBERT FRANCIS COLBORNE, OF STRATHFIELD, NEAR SYDNEY, NEW SOUTH WALES, AUSTRALIA.

MECHANISM FOR OPERATING WHEEL-BRAKES BY HAND FOR RAILWAY PURPOSES.

1,075,012.	Specification of Letters Patent.	Patented Oct. 7, 1913.

Application filed October 20, 1911. Serial No. 655,742.

*To all whom it may concern:*

Be it known that I, ROBERT FRANCIS COLBORNE, a citizen of the Commonwealth of Australia, residing at Strathfield, near Sydney, in the State of New South Wales, Commonwealth of Australia, have invented new and useful Improvements in Mechanism for Operating Wheel-Brakes by Hand for Railway Purposes, of which the following is a specification.

This invention relates to mechanism serviceable for controlling by hand the operations of putting "on" or "off" the brakes of railway wheels, through the medium of the usual air pressure cylinder combined with a system of levers and connecting rods in association with the wheel brakes, but without affecting the usual general arrangement of working parts as regards the ultimate transmission of the pressure to the brakes.

The invention provides a simple form of mechanism for actuating, by hand, the main connecting rod attached to the primary piston lever of the air pressure cylinder, and may be quickly and with certainty put into action while the railway carriage, car, or truck is on the move, as, for instance, when in the marshaling yard, or when being shunted or otherwise moved from one location to another, the desired effect being produced by handling an endless rope attached on both sides of the vehicle to shielded grooved wheels placed beneath the framework and connected to transverse shafts or spindles, one of which serves the purpose of an actuating shaft, having thereon the usual lever connected by a running chain to the main connecting rod of the piston lever, and is provided with a free grooved wheel combined with a gapped collar, which is used to actuate a tilting arm supported in a standard keyed to the actuating shaft, and revolving with it, moving in the direction corresponding to the strain put upon the endless rope. Associated with this tilting arm is a gripper, to serve the purpose of a brake to the said actuating shaft, and to prevent the wheel brakes being released until the attendant again handles the mechanism. It is put into operation by frictional contact with a fixed drum fastened to the under carriage. The eye of the drum forms one of the bearings for the actuating shaft, which, at its inner end, is provided with a screw running in a controlling nut having a limited travel commensurate with the number of revolutions of the shaft necessary to operate the wheel brakes. This device further prevents the said shaft from being over wound.

This system of applying the brakes by hand is intended to supersede the primitive means now employed, which consist of a hand wheel with circular ratchet, spindle, and eyebolt, associated with a looped chain which is wound around the shaft, such a form of mechanism requiring the use, by the operator, of both hands for putting the brakes "on", whereas, with the present invention the operator is required to use one hand only.

The invention may, with slight modifications incidental to structural differences in the vehicles, be applied to various kinds of rolling stock.

Referring to the accompanying drawings, which form part of this specification: Figure 1 is a plan of part of the under frame of a railway goods truck, showing the general arrangement of the wheels, hand ropes, and shafts comprising the invention, and its application to the usual levers of an air pressure brake cylinder. Fig. 2 is a side elevation of Fig. 1, showing the shielded grooved wheels and endless rope attachment. Fig. 3 is a sectional elevation on line *a—a* of Figs. 1 and 2, showing shielded grooved wheels on through shaft which extends to both sides of truck, the framing and shaft being partly broken away. Fig. 4 is a sectional elevation on line *b—b* of Figs. 1 and 2, showing brake actuating shaft with shielded grooved wheel on one side of truck, and short spindle with shielded grooved wheel on the other side, also brake cylinder and lever, the framing being partly broken away. Fig. 5 is a sectional elevation on line *c—c* of Figs. 1 and 2, showing truck doors in hanging position against fender irons, with grooved wheels indicated in dotted lines behind doors, also brake cylinder with lever, part of framing being broken away. Fig. 6 is an external elevation of shield covering grooved wheel and actuating shaft and mechanism. Fig. 7 is a vertical sectional elevation on line *d—d* of Fig. 6, showing fragment of truck framing, shielded grooved free wheel, actuating shaft, gapped collar, tilting lever, gripper, standard, fixed drum, controlling screw nut, and means for attaching same to framing. Fig. 8 is a horizontal sectional plan on line e—e of Fig. 6, showing wheel shield, wheel, actuating shaft, and associated operative parts. Fig. 9 is a detail of the gapped collar in its position for operating tilting lever, to put off gripper to release brakes. Fig. 10 is a detail of the gapped collar in position for operating tilting lever in reverse direction to Fig. 9, by which the brakes, when applied, are secured. Fig. 11 is another detail of the gapped collar in position for operating the standard supporting the tilting lever and gripper. Figs. 12 and 13 are details of the gapped collar with tilting lever associated with a ratchet pawl and ratchet wheel, as an alternative device to the combination shown in Figs. 9, 10, and 11. Fig. 14 shows, partly in section and elevation, the operating rope handle with internal concussion spring. Fig. 15 is a similar view to Fig. 14, of an alternative form of operating rope handle.

The invention is shown attached to a railway goods wagon or truck, having centrally situated fall-down doors A on each side, supported by the hinges $A^1$. In Figs. 5 and 7 the doors are shown suspended to illustrate how the operative parts of the invention are protected against possible disarrangement. The well known parts belonging to this form of goods truck are, the longitudinal channel-iron side frames B, the longitudinal timbers $B^1$ to which the flooring $B^2$ is secured, and the transverse bearers $B^3$ and $B^4$. The brake cylinder C, its piston rod $C^1$, the fore and aft wheel brake operating levers $C^2$ and $C^3$, the lever hangers $C^4$, the operating connecting rod D with its chain sheave $D^1$, the rod hanger $D^2$, the looped chain E attached both to the short winding crank F which I substitute for the eyebolt (by which it is operated) and to the tension rod G secured to the transverse bearer $B^4$, are the present associated parts serviceable for use with my invention, but which have hitherto been allied to a spindle actuated by a spider wheel or cross arm combined with a pawl and ratchet gear arranged to operate the brakes from either side of the truck, and necessitating the use, by the attendant, of both hands for the purpose of operating the brakes. In substitution for that form of spindle and its attachments, the peculiarly constructed actuating shaft H (hereafter more fully referred to) is provided, and placed approximately in the same position, with the short winding crank F secured to it.

To render the invention operative from either side of the truck, the through shaft I is provided, to run freely in the spring steel hangers J which are suspended from the framing, and are adapted to sustain the concussion when the power is applied suddenly, and to preserve the rope tension. The grooved wheels K, being secured to said shaft, will rotate with it. On one side, the short spindle $I^1$, made rigid in the hanger L and the plate support $L^1$ (Fig. 4), carries a free running grooved wheel $K^1$, which is kept in position by an outer collar $I^2$. The free grooved wheel $K^2$ on the actuating shaft H completes the set essential for carrying the endless operating ropes M, which are strained to give the necessary grip in the grooves. Each wheel is hidden from view and protected with an outer casing or shield N, fastened to timber supports O attached to the hangers P (Figs. 3, 4, and 8). Pierced wood guides $N^1$, shown dotted in Fig. 6, serve as stiffeners to the shield to prevent it buckling, and also to prevent the displacement of the rope from the wheel, and to prevent its frictional contact with the shield. To each line of ropes is fixed the operating handle Q, and, at either side of the truck is placed the word "On" associated with an arrow, as in Fig. 2, to indicate the direction in which the rope is to be pulled to operate the mechanism and apply the brakes. Either form of handle shown in Figs. 14 and 15 is serviceable, the former being rubber covered. They consist of a recoil spring $Q^1$ (which encircles the rope M) retained between seating collars $Q^2$, which are restricted in their movement by sleeve pieces $Q^3$ fastened with pins $Q^4$. The tubular outer casing or handle Q is then secured at both ends with the externally screwed nuts $Q^5$, which seat themselves against the collars $Q^2$. When a handle is gripped and pushed longitudinally in either direction, jarring of the hand is prevented by the compression of spring $Q^1$ as the nuts $Q^5$ slide freely on the sleeve pieces $Q^3$.

Either of the four operating handles shown in Fig. 1 may be used to put the brakes in action through the movement of the actuating shaft H (hereinbefore referred to) having the free wheel $K^2$ thereon, the following associated parts being provided to secure the desired results. Upon the actuating shaft H, shown broken in Figs. 7 and 8, is the aforesaid grooved wheel $K^2$, with its gapped collar $K^3$ provided with three contact surfaces, 4, 5, and 6, (Fig. 8), so arranged that surface 4 (Fig. 9) may, by moving wheel $K^2$, be brought against the edge of bow shaped tilting arm $R^2$ (Fig. 7), at the same time lifting gripper $R^3$—which is part of the arm—from the surface of fixed drum S, the eye of which is one of the supports for shaft H. The combined arm $R^2$ and gripper $R^3$ hangs upon pin $R^1$ of standard R, which is fastened to the shaft and turns with it when in contact with surface 5 (Figs. 11 and 12). This, however, can only happen after gripper $R^3$ is released. Spring attachment $R^4$, secured to standard R, by its pressure against the bow part of tilting arm R², causes the gripper R³ to seat itself upon drum S, as shown in Fig. 10. In Figs. 12 and 13, a pawl S³ is substituted for the gripper, and a fixed ratchet wheel S¹ for the fixed drum. By means of either combination the desired purpose of securing the wheel brakes against accidental release may be effected.

The operation of putting the wheel brakes "hard on" is accomplished by simply pulling one of the handles Q a sufficient distance in the direction indicated by the arrow associated with the word "On", Fig. 6, and so rotating the wheel K², whereby surface 6 of the gapped collar K³ is pressed against the standard R, and the actuating shaft H is revolved sufficiently to wind up the looped chain E connected to crank F, and thereby moving the connecting rod D and the various parts ordinarily interposed between it and the wheel brakes, none of which are claimed in this invention. While the standard R is revolving, the tilting arm R² and gripper R³ are out of use, but when the winding up of chain E has been completed, a slight recoil action causes gripper R³ to seat itself upon fixed drum S, or if a pawl S³ is used it will catch in the ratchet wheel S¹, and the brakes will be held securely until the attendant pulls one of the handles Q in the direction indicated by the arrow associated with the word "Off", Fig. 6. When wheel K² is rotated in that direction, the surfaces 4 and 5 of gapped collar K³ are seated, the one against tilting arm R², and the other against standard R, gripper R³, or pawl S³, whichever may be in use, is released, and shaft H revolved sufficiently to unwind chain E, the associated brake parts acting responsively. To prevent the controlling rope from slipping in the wheel K² or the other grooved wheels, the groove may be made sufficiently tapered to insure a good grip. Sprocket wheels and sprocket chain may be used as a substitute for the wheels and for a portion of the endless rope.

As a safeguard against possible overwinding of the actuating shaft H, the screw thread T is provided, near the suspended end, with a traveling nut T¹, which slides upon the surface U¹ of the shaft hanger U, and cushions itself against spring washers T². The travel of the nut is made to correspond to the number of turns to be made by the shaft, which is kept in position endwise by collars H¹ and H².

In the case of railway vehicles having fall-down doors A with hinges A¹, provision is made to prevent said doors coming into contact with ropes M, by using spring fender pieces A³ attached to the looped hangers A⁴. The position of door plates A² coincides with that of the hangers, and will prevent injury being done to surface of door. In Fig. 7 the door is shown in broken lines.

Having now described my invention, what I claim as new and desire to secure by Letters Patent is:—

1. In a hand operating brake attachment of a vehicle having wheel brakes mechanically operated through the medium of a brake cylinder and associated levers combined with a connecting rod, sheave, and looped chain, a set of shafting and grooved wheels arranged in pairs on each side of the railway vehicle, comprising a through shaft, spring hangers for adjustably suspending said shaft, grooved wheels secured to the shaft and rotating therewith, a short spindle secured to and supported in a rigid hanger, a grooved wheel running freely on said spindle, an actuating shaft having a grooved free wheel combined with a gapped collar thereon, a fixed drum and an angle hanger supporting said shaft, endless ropes connecting each pair of wheels, and, wheel shields covering each wheel, substantially as described.

2. A wheel shield, consisting of a casing splayed and flanged for attachment to hanging supports, pierced centrally to receive the wheel shaft, and, upper and lower wood guides and stiffeners pierced to receive the wheel rope, substantially as described.

3. As a rope attachment for operating grooved wheels, a handle consisting of a tubular outer casing, a recoil spring located within said casing, seating collars, sleeve pieces arranged externally against said collars, and, externally screwed nuts fitting into tubular casing against the collars, and sliding on sleeve pieces, as described.

4. In mechanism employed for operating wheel brakes of railway vehicles, an actuating shaft carrying a free grooved wheel combined with a gapped collar, a screw thread on said shaft, a traveling nut thereon, spring washers on one side of the nut, a standard and a winding crank secured to the shaft and rotating with it, and securing collars fixed on the ends of said shaft, substantially as described.

5. In combination with an actuating shaft, fixed hanging supports for the actuating shaft, consisting of a drum having a centrally situated bore to receive the shaft, and a peripheral surface adapted to be in contact with a movable gripper, and a hanger bored to receive the shaft and having an angled part forming a seating surface for a traveling nut, substantially as described.

6. In combination with an actuating shaft, a hanging support for the actuating shaft, consisting of a fixed ratchet wheel having a centrally situated bore to receive the shaft, the wheel being arranged on the peripheral surface of the hanger to be in contact with a movable ratchet pawl, substantially as described.

7. As an attachment to a wheel brake actuating shaft, a standard keyed or pinned to the shaft, a spring fixed to the standard, a bow shaped combined tilting arm and gripper suspended from the standard in contact with the said spring, the whole arranged to rotate with the shaft, substantially as described.

8. As an attachment to a wheel brake actuating shaft, a standard keyed or pinned to the shaft, a spring fixed to the standard, a bow shaped combined tilting arm and movable ratchet pawl suspended from the standard in contact with the said spring, the whole arranged to rotate with the shaft, substantially as described.

9. In combination, a rotating shaft, a grooved free wheel and a gapped collar on said shaft, triple contact surfaces formed on said collar, a fixed drum placed contiguous to the gapped collar and serving as a hanger for the shaft, a standard secured to the shaft between said collar and drum, a spring and bow shaped tilting arm and gripper attached to the standard; the standard, spring, and tilting arm being arranged to aline with the triple contact surfaces of the gapped collar, substantially as described, and for the purposes set forth.

In testimony whereof I have signed my name to this specification in the presence of two subscribing witnesses.

ROBERT FRANCIS COLBORNE.

Witnesses:
JOHN JASPER STONE,
HARRY A. SMEDLEY.